United States Patent
Cesareo et al.

(10) Patent No.: US 10,457,557 B2
(45) Date of Patent: *Oct. 29, 2019

(54) PROCESS FOR PREPARING GRAPHENE NANOPLATELETS

(71) Applicant: Directa Plus S.P.A., Lomazzo (IT)

(72) Inventors: Giulio Cesareo, Como (IT); Maria Riccardo Parrini, Milan (IT); Laura Giorgia Rizzi, Saronno (IT)

(73) Assignee: DIRECTA PLUS S.P.A., Lomazza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/313,205

(22) PCT Filed: Jun. 16, 2015

(86) PCT No.: PCT/EP2015/063398
§ 371 (c)(1),
(2) Date: Nov. 22, 2016

(87) PCT Pub. No.: WO2015/193268
PCT Pub. Date: Dec. 23, 2015

(65) Prior Publication Data
US 2017/0190583 A1  Jul. 6, 2017

(30) Foreign Application Priority Data

Jun. 20, 2014 (IT) .......................... MI2014A001123

(51) Int. Cl.
*C01B 32/19* (2017.01)
*B82Y 30/00* (2011.01)
*B82Y 40/00* (2011.01)

(52) U.S. Cl.
CPC ............... *C01B 32/19* (2017.08); *B82Y 30/00* (2013.01); *B82Y 40/00* (2013.01);
(Continued)

(58) Field of Classification Search
CPC ............ C01B 31/0469; C01B 2204/04; C01B 2204/32; C01P 2004/24; C01P 2006/80; Y10S 977/842; Y10S 977/734; B82Y 30/00; B82Y 40/00
See application file for complete search history.

(56) References Cited

U.S. PATENT DOCUMENTS

| | | |
|---|---|---|
| 4,773,833 A | 9/1988 | Wilkinson et al. |
| 8,367,004 B2 | 2/2013 | Panagiotou et al. |
| | (Continued) | |

FOREIGN PATENT DOCUMENTS

| | | |
|---|---|---|
| EP | 2038209 B1 | 8/2012 |
| WO | 2009106507 A2 | 2/2009 |
| | (Continued) | |

OTHER PUBLICATIONS

Yi, Min, Zhigang Shen, and Jinyang Zhu. "A fluid dynamics route for producing graphene and its analogues." Chinese science bulletin 59.16 (2014): 1794-1799.*

(Continued)

*Primary Examiner* — Richard M Rump
(74) *Attorney, Agent, or Firm* — Hunton Andrews Kurth LLP

(57) ABSTRACT

Process for producing graphene nanoplatelets, comprising expanding flakes of intercalated graphite and collection of the same in a dispersing medium with forming of a dispersion that is subjected to exfoliation and size reduction treatment carried out by high pressure homogenization in a high shear homogenizer. A dispersion of graphene is obtained in the form of nanoplatelets, at least 90% of which have a lateral size (x, y) from 50 to 50,000 nm and a thickness (z) from 0.34 to 50 nm.

8 Claims, 1 Drawing Sheet

(52) U.S. Cl.
CPC ...... *C01B 2204/04* (2013.01); *C01B 2204/32* (2013.01); *C01P 2004/24* (2013.01); *C01P 2006/80* (2013.01); *Y10S 977/734* (2013.01); *Y10S 977/842* (2013.01)

(56) References Cited

U.S. PATENT DOCUMENTS

| | | | |
|---|---|---|---|
| 2002/0054995 A1 | 5/2002 | Mazurkiewicz | |
| 2010/0147188 A1* | 6/2010 | Mamak | B82Y 30/00 106/31.13 |
| 2011/0300056 A1 | 12/2011 | Mercuri | |
| 2012/0270960 A1* | 10/2012 | Felisari | B82Y 30/00 521/90 |
| 2014/0106153 A1 | 4/2014 | I-Chiao et al. | |
| 2017/0305747 A1* | 10/2017 | Yang | B82Y 30/00 |

FOREIGN PATENT DOCUMENTS

| | | |
|---|---|---|
| WO | 2014082008 A1 | 5/2014 |
| WO | 2014135455 A1 | 9/2014 |

OTHER PUBLICATIONS

Folke, Johannes Tolle et al.; "Emulsifier-Free Graphene Dispersions with High Graphene Content for Printed Electronics and Freestanding Graphene Films"; Advanced Functional Materials, Wiley—VCH Verlag GmbH & Co. KGAA, DE, vol. 22, No. 6, Mar. 21, 2012, pp. 1136-1144.

Azoubel, S. et al.; "The formation of carbon nanotube dispersions by high pressure homogenization and their rapid characterization by analytical centrifuge"; Carbo, Elsevier, Oxford, GB, vol. 48, No. 12, Oct. 1, 2010, pp. 3346-3352.

Schluter, Bernadette, et al.; "Synthesis and Tribological Characterization of Stable Dispoersions of Terhmally Reduced Graphite Oxide"; Tribology Letters, Baltzer Science Publishers, NL, vol. 53, No. 1, Dec. 1, 2013, pp. 353-363.

Chatterjee, S., et al., "Mechanical reinforcement and thermal conductivity in expanded graphene nanoplatelets reinforced epoxy composites"; Chemical Physics Letters, vol. 531, Feb. 11, 2012, pp. 6-10.

International Search Report dated Nov. 2, 2015 for PCT Application No. PCT/EP2015/063398 filed Jun. 16, 2015.

* cited by examiner

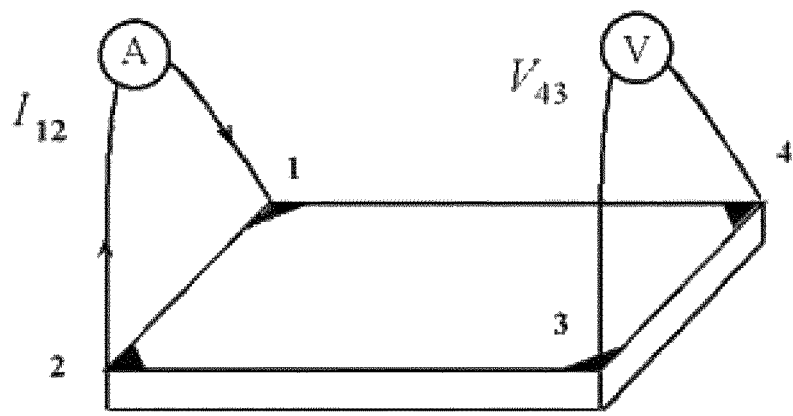
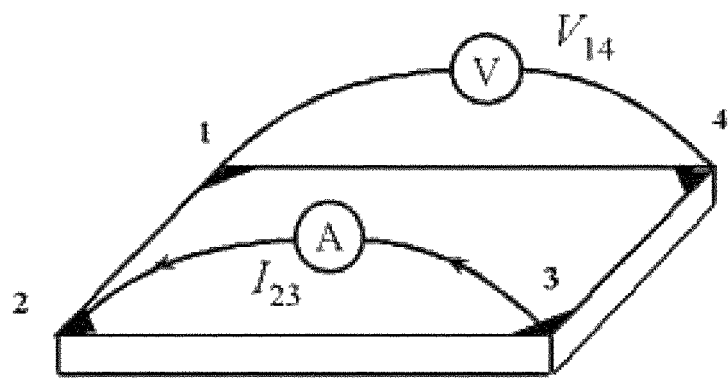

PROCESS FOR PREPARING GRAPHENE NANOPLATELETS

CROSS-REFERENCE TO RELATED APPLICATIONS

This application claims priority under 35 U.S.C. 371 to PCT/EP2015/063398, filed on Jun. 16, 2015, which in turn claims priority to Italian Application Serial No. MI2014A001123, filed on Jun. 20, 2014. The contents of each of these applications is incorporated by reference in their entirety for all purposes.

The present invention relates to a process for preparing graphene nanoplatelets.

Graphene is a material formed by a single atomic layer of $sp^2$ hybridized carbon atoms. These are arranged in hexagonal close-packed honeycomb structures that form the fundamental structural elements of graphite, of carbon nanotubes and of fullerenes.

Graphene is a material with unique properties: it is a zero band-gap semiconductor with high charge carrier mobility (up to 200,000 cm$^2$/Vs), very high mechanical strength (tensile strength ~40 N/m, Young's Modulus ~1.0 TPa), exceptional thermal conductivity (~5000 W/km) and high electric current carrying capacity (~1.2 mA/µm). These properties allow graphene to be used for applications in market segments that require the use of advanced materials. Therefore, graphene based materials are studied from a scientific and industrial point of view for applications in markets such as electronics, photovoltaics, batteries, sensors, optoelectronics and nanocomposites.

The term graphene "nanoplatelet" is intended as a substantially flat graphene particle, with a thickness (z) in the order of nanometers, typically less than 100 nm, and lateral sizes (x, y) greater than the thickness.

Scientific and patent literature describes various methods for the preparation of graphene, such as chemical vapor deposition, epitaxial growth, chemical exfoliation and chemical reduction of the oxidized form graphene oxide (GO).

The Applicant Directa Plus S.p.A. is the holder of European patent EP 2 038 209 B1, which describes and claims, among other things, a method for producing structures comprising graphene layers, obtained by intercalation and subsequent expansion/exfoliation of graphite.

US 2011/0300056 by the same Applicant describes the production of nano-structures by a graphite intercalation and exfoliation treatment at high temperature in an inert plasma environment. The exfoliated graphite can pass directly into a liquid medium suitable to the end use of the exfoliated graphite.

WO 2009/106507 describes the preparation of graphite nanoplatelets with a process that comprises thermal plasma expansion of intercalated graphite followed by an exfoliation step carried out by means of ultrasonication, wet milling or controlled cavitation. Exfoliation of the expanded graphite with the wet milling method is carried out with a bead mill.

US 2002/0054995A1 describes graphite platelet nano-structures obtained by treating standard graphite in a high pressure mill. The standard graphite can be treated in dry or wet state. In the case of wet treatment, water can be used as the liquid dispersion medium, but the preferred liquid has a low boiling point (e.g. 50° C.), such as a perfluorocarbon.

Panagiotou, T; Bernard, J. M.; Mesite, S. V.; NSTI-Nanotech 2008, www.nsti.org, ISBN 978-1-4200-8503-7 Vol. 1, pp. 39-42, describe the deagglomeration and the dispersion of carbon nanotubes (CNT) using a high shear fluid processor for fluid treatment, named Microfluidizer®, by Microfluidics Corp. (USA). The dispersion of CNT in water is also described, at a very low concentration (1%).

Azoubel, S; Magdassi, S; CARBON 48 (2010); pp. 3346-3352, describe the formation of CNT dispersions using high pressure homogenization with the Microfluidizer® apparatus by Microfluidics Corp. (USA). Before the high pressure homogenization treatment, aqueous dispersions of the CNT are prepared at a very low concentration (0.1%) in the presence of a non-ionic surfactant (Triton X100™) in an Ultra-Turrax® type homogenizer.

US 2014/0106153 A1 discloses a graphene platelet fabrication method comprising: a) providing a highly-graphitized graphene; and b) applying a shear force on the highly-graphitized graphene to separate it into a plurality of graphene platelets. The lateral size of these platelets is rather large, namely 10-500 µm. A pre-treatment to swell the highly-graphitized graphene may be required. The pre-treatment method is selected from the following methods: explosion, chemical exfoliation, ultrasonication, ball milling.

Tölle F. J. et al, "Emulsifier-Free Graphene Dispersions with High Graphene Content for Printed Electronics and Freestanding Graphene Films" Adv. Funct. Mater. 2012, 22, 1136-1144, describe dispersions of graphene oxide (GO) in water, with an oxygen content of from 4 to 16 wt %. When the oxygen content is 4 wt % or less, however, attempts to disperse thermally reduced GO in water failed.

Prior art methods for producing graphene nano-structures, including graphene nanoplatelets, have various disadvantages, such as obtaining graphene at low outputs and/or with high energy consumption, or with too large size. Also, several prior art methods produce graphene oxide as opposed to pristine graphene. Aqueous dispersions of graphene oxide are easier to form than aqueous dispersions of pristine graphene, but the best properties of graphene are obtained when the amount of graphene oxide is minimum.

Other disadvantages consist in the difficulty of obtaining graphene nanoplatelets of very small sizes and/or in the form of suspensions that are not too dilute. In fact, the prior art processes in general produce relatively dilute dispersions of graphene, which is inconvenient in order to obtain a dry end product or end product in the form of concentrated dispersion, as large volumes of dilute dispersion obtained from the production process must be treated. In fact, the majority of industrial applications of graphene mentioned above rely on the availability of graphene preferably in a form that is concentrated, easy-to-use, relatively inexpensive and safe from a health and environmental point of view.

Therefore, an object of the present invention is to provide a process for preparing graphene with low energy consumption and limited investment and management costs.

Another object of the invention is to provide a process that allows graphene nanoplatelets with very small sizes and with a very high aspect ratio to be obtained.

A further object of the invention is to provide a process that allows graphene nanoplatelets to be obtained in the form of relatively concentrated dispersion, produced with a dispersing medium also adapted to optimize the end uses of the same graphene.

A still further object of the invention is to provide a process that allows to obtain graphene nanoplatelets with a very low oxygen content, namely to obtain essentially pristine graphene nanoplatelets.

The aforesaid and other objects and advantages of the invention are achieved with a process for producing graphene nanoplatelets having a C/O ratio ≥100:1, comprising:

a) the expansion of flakes of intercalated graphite having a lateral size ≤500 μm by exposing these flakes to a temperature from 1300 to 12000° C. for a time of less than 2 seconds, b) dispersion of the expanded graphite thus obtained in a dispersing medium, characterized in that:

c) the dispersion obtained from step b) is subjected to exfoliation and size reduction treatment by high pressure homogenization in a homogenizer in which the dispersion of expanded graphite is pumped at a pressure above 35 MPa through one or more micro-channels or necks having a transverse section of no more than 500 μm, wherein the particles of expanded graphite are subjected to shear stresses and are caused to collide at an energy level from 5 to 200 Wh/g.

According to an aspect of the invention, the exfoliation and size reduction treatment produces graphene in the form of nanoplatelets, at least 90% of which have a lateral size (x, y) from 50 to 50,000 nm and a thickness (z) from 0.34 to 50 nm, the lateral size being greater than the thickness (x, y>z).

According to a further aspect of the invention, the dispersion of graphite in said dispersing medium of said step b) is carried out directly after the step of expansion at high temperature by collecting the expanded graphite in the dispersing medium just after its formation.

The dispersing medium is a liquid or semi-liquid medium adapted to ensure a good dispersion of the expanded graphite produced in step a). In the present description, the expression "liquid or semi-liquid medium" means a liquid or fluid having a viscosity of less than 15000 mPas in the conditions at which the dispersion of step b) is produced, i.e. at ambient temperature or also at a higher temperature, when this is necessary to fluidify a dispersing medium that otherwise would not be fluid. For example, although a polymer could be used as dispersing medium, it might have to be heated until it melts to obtain a dispersing medium with a sufficiently low viscosity to allow the dispersion of expanded graphite therein. This viscosity is measured with the method ASTM D445 or with the method ASTM D4440, according to the type of material forming the dispersing medium.

Suitable liquid or semi-liquid media are, for example, aqueous media, in particular water, organic solvents or diluents, mineral oils, vegetable oils, natural or synthetic polymers, in which case the desired viscosity can be obtained by heating the polymer until it melts, by total or partial dissolution of the polymer in an suitable solvent, by diluting it in an suitable diluent, or by adjustment of the molecular weight to a sufficiently low value to maintain a viscosity of less than 15000 mPas, as a function of the type of polymer, as is known to those skilled in the art.

The term "mineral oil" in the present description designates any of various colorless, odorless, light mixtures of higher alkanes, typically from 9 to 16 carbon atoms, derived from a non-vegetable (mineral) source, particularly a distillate of petroleum.

According to a preferred embodiment, the process for producing graphene is carried out in a continuous way by continuously feeding the graphite flakes to the high temperature expansion step, continuously discharging the so-obtained expanded graphite in a liquid or semi-liquid medium and continuously subjecting the expanded graphite dispersed in this dispersing medium to the exfoliation and size reduction treatment by high pressure homogenization.

According to a preferred embodiment, the step of expansion at a temperature from 1300 to 12000° C. for a time of less than 2 seconds is carried out by means of an electric arch, or in a microwave or high frequency induction oven, or by forming plasma. This last treatment is particularly preferred as it is possible to reach the temperature required associated with high turbulence.

In the present description the size of the graphene nanoplatelets is defined with reference to a system of Cartesian axes x, y, z, it being understood that the particles are substantially flat platelets but may also have an irregular shape. In any case, the lateral size and the thickness provided with reference to the directions x, y and z must be intended as the maximum sizes in each of the aforesaid directions.

The lateral sizes (x, y) of the graphene nanoplatelets are determined using laser diffractometry (Mastersizer 3000, Malvern Instruments). This type of analysis provides an indication of the population distribution referred to the lateral size of the graphene nanoplatelets.

The thickness (z) of the graphene nanoplatelets is determined with the atomic force microscope (AFM), which is essentially a profilometer with subnanometer resolution, widely used for characterization (mainly morphological) of the surfaces and of the nanomaterials. This type of analysis is commonly used, both for academic purposes and in industrial R&D, to evaluate the thickness of the graphene flakes, produced with any method, and to detect the number of layers forming the flake (single layer=0.34 nm).

The nanoplatelets of the final dispersion, deposited as described for SEM analysis, are scanned directly with an AFM tip, where the measurement provides a topographical image of the graphene flakes and their profile with respect to the substrate, enabling precise measurement of the thickness.

The final dispersion of the graphene nanoplatelets obtained after the exfoliation and size reduction treatment carried out as defined above can advantageously be concentrated or dried, depending on the final form required for the graphene.

In the final dispersion obtained with the process according to the invention, at least 90% of the graphene nanoplatelets preferably have a lateral size (x, y) from 50 to 50,000 nm, more preferably from 500 to 35,000 nm, and preferably a thickness (z) from 0.34 to 50 nm, more preferably from 0.34 to 12 nm, the lateral size being greater than the thickness (x, y>z). The amount of the size reduction of the graphene nanoplatelets is a function of the intensity and of the duration of the high pressure homogenization treatment, as also indicated in the examples that form part of the present description.

In the final dispersion according to the invention the C/O ratio in said graphene nanoplatelets is ≥100:1; preferably ≥200:1. This ratio is important as it defines the maximum amount of oxygen bonded to the carbon forming the graphene, i.e. of graphene oxide. It is in fact known that the best properties of graphene are obtained when the amount of graphene oxide is minimum. On the other hand, the polar character of the graphene oxide makes it more hydrophilic and therefore suitable for the formation of aqueous dispersions. One of the technical problems solved by the process according to the invention is therefore that of obtaining dispersions of graphene in water while maintaining the content of graphene oxide very low, as defined above.

The C/O ratio in the graphene of the dispersion according to the invention is determined by elementary analysis performed by Inductively Coupled Plasma Mass Spectrometry (ICP-MS), which provides the percentage by weight of the various elements. By normalizing the values obtained with respect to the atomic weight of the C and O species and finding their ratio, the C/O ratio is obtained. The reticular defects of the nanoplatelets can be evaluated using Raman spectroscopy by analyzing the intensity and shape of the Peak D positioned at 1350 $cm^{-1}$. The use of graphene nanoplatelets is advantageous in many industrial applications, such as:

- use as additive or component of elastomeric compositions for tires, where it is advantageous to reach graphene levels of up to 15% by weight in order to achieve desired properties such as: i) an improved gas barrier effect, with consequent increase of impermeability, causing the tire to deflate more slowly; ii) improvement of the mechanical dynamic properties, in particular rolling resistance; iii) increase of thermal conductivity, useful for heat dissipation; iv) increase of electrical conductivity, useful for the dissipation of electrostatic energy;
- use as additive or component of paints and silicone compositions, where it is advantageous to reach graphene levels of up to 20-30% by weight in order to achieve desired properties, such as: i) increase of thermal conductivity for heat dissipation, ii) increase of electrical conductivity, to reach conductive compounds; iii) gas and liquid barrier effect with consequent increase of impermeability, to give anticorrosion and antifouling properties;
- use as additive or component in compositions for treating articles such as textiles, where it is advantageous to reach graphene levels of up to 40% by weight in order to achieve desired properties, such as: i) good electrical conductivity, for producing "intelligent" textiles; ii) good thermal conductivity; iii) liquid barrier effect; iv) flame retardant properties; v) EM and IR shielding.

In some applications, for example in the treatment of textiles, the direct use of suspensions of graphene in water is possible, as the preparation of a dispersion or suspension to apply to the textile is in any case required, according to various technical processes available to those skilled in the art. In other applications it is preferable to use a dispersion of graphene in other liquid or semi-liquid media, such as organic solvents, oils, molten or liquid resins.

Examples of suitable organic solvents or diluents are acetone, ethanol, methyl ethyl ketone (MEK), methyl isobutyl ketone (MIBK), N-methylpyrrolidone (NMP), N-ethylpyrrolidone (NEP), hexane, isopropyl alcohol (IPA), dimethylformamide (DMF), dimethyl sulfoxide (DMSO), toluene.

Examples of suitable oils are aromatic mineral oils, including naphthenic oils, paraffinic mineral oils, ester based synthetic oils, and ether based synthetic oils.

Examples of suitable polymers are epoxy resins. Other types of thermoplastic or thermosetting polymers can be used. If necessary, the required viscosity can be obtained by heating the polymer, obtaining softening or melting thereof.

The process for producing graphene according to the invention comprises several steps.

The first step of the process consists of the preparation of expanded and/or exfoliated graphite starting from intercalated graphite.

The intercalated graphite can be prepared with methods known to those skilled in the art or purchased on the market. The expansion step of the intercalated graphite is performed by exposing flakes of intercalated graphite (Graphite Intercalation Compounds, GICs) having a lateral size ≤500 μm to a temperature from 1300 to 12000° C. for a time of less than 2 seconds. This treatment is performed as described in the patent EP 2038209 B1, i.e. by generating heat within the GICs, preferably using an electric arc, a microwave or high frequency induction furnace or by forming plasma. This last treatment is particularly preferred as it is possible to reach the temperature required associated with high turbulence.

The second step of the process (step b) comprises collecting and dispersing the expanded graphite obtained in step a) in a dispersing medium, such as a liquid or semi-liquid having a viscosity of less than 15000 mPas, as stated previously.

Preferably, the expanded graphite is precipitated by gravity in a receptacle containing the suitable dispersing medium.

According to an advantageous embodiment the dispersing medium is water.

Contrary to the teachings of the prior art, it was surprisingly found that if the expanded graphite just formed is added to a dispersing medium consisting of water, optimal dispersion can be obtained without requiring to use a surfactant. However, a small amount of surfactant, i.e. an amount of less than 1% by weight of the weight of the graphite, can be used.

Without being bound to any theory or explanation, it is believed that adding the expanded graphite to water just after its formation preserves a certain hydrophilic character of the expanded graphite, which is a useful condition for high compatibility with water and consequently for obtaining a good and stable dispersion. On the contrary, by leaving the expanded graphite just formed in contact with the air, this would cause adsorption of volatile organic compounds (VOC), which give the graphite a hydrophobic character, causing a decrease in its dispersibility in water. In this case the aqueous dispersion can advantageously be obtained in the presence of surfactant in a suitable amount, preferably in an amount from 1% to 20% by weight of the weight of said graphite.

Obtaining an excellent aqueous dispersion of expanded graphite without the aid of surfactants represents an important advantage of the process according to the invention, both due to the decrease in costs resulting from saving on surfactant, and due to the properties of the end product particularly suitable for certain applications in which it is desirable to obtain a highly pure graphene.

If the aqueous dispersion of the expanded graphite is carried out in the presence of a surfactant, the surfactant is preferably an anionic surfactant, more preferably an anionic surfactant in which the anion forming the hydrophilic polar group is selected from sulfonate, sulfate, carboxylate and the hydrophobic nonpolar part is selected from structures comprising aromatic rings such as benzene, naphthalene, pyrene or cyclic aliphatic structures such as derivatives of cholic acid. Particularly preferred surfactants are sodium benzenesulfonate and sodium naphthalene sulfonate.

Dispersion is obtained by stirring.

The expanded graphite is dispersed in the dispersing medium at a concentration from 0.5% to 60% by weight, preferably from 1% to 50% by weight, more preferably from 2% to 40% by weight.

The third step of the process (step c) has the object of obtaining exfoliation and size reduction of the expanded graphite to obtain graphene nanoplatelets, at least 90% of which have a lateral size (x, y) from 50 to 50,000 nm and a thickness (z) from 0.34 to 50 nm, the lateral size being greater than the thickness (x, y>z).

This exfoliation and size reduction is obtained by subjecting the dispersion of step b) to high pressure homogenization treatment, characterized by establishing high shear stresses, in which the particles of expanded graphite are caused to collide.

The high pressure homogenization treatment is performed with a homogenizer in which the dispersion of expanded graphite is pumped at a pressure above 35 MPa through one or more micro-channels or necks having a transverse section of no more than 500 μm. Here the dispersed particles are subjected to very high shear stresses, deriving from the sudden pressure drop, and to collision with one another and/or with the surfaces of the micro-channels, at an energy level from 5 to 200 Wh/g, preferably from 7 to 80 Wh/g. This energy level can be achieved by subjecting the dispersed particles to one or more cycles of treatment. It must be specified that the term "neck" is intended as a reduction of the cross section of the duct substantially in one point through which the dispersion is forced to flow, while the term "micro-channel" is intended as a neck that extends in the direction of flow of the dispersion of particles.

Preferably, the transverse section of the micro-channels or necks is ≤250 μm; more preferably ≤100 μm. Preferably, the pressure at which the dispersion is pumped in the micro-channels or necks is from 100 to 500 MPa; more preferably from 150 to 500 MPa.

This treatment allows a substantial size reduction of the expanded graphite to be obtained, up to the values according to the axes x, y and z mentioned previously.

The micro-channels or necks can be of static type, such as flow channels having a maximum size of 500 μm, or of dynamic type, such as valves with a section that is adjustable so as to define a neck having a maximum size of 500 μm.

High pressure homogenization apparatus using necks of static type are marketed by Microfluidics International Corporation (Newton, Mass., U.S.A.) with the trade name Microfluidizer®. In these apparatus, the dispersion of expanded graphite is pumped at a pressure above 35 MPa through a plurality of flow channels having a maximum size of 500 μm, in which the particles of expanded graphite are made to collide. The structure and the operation of this apparatus are also described, among other things, in the U.S. Pat. No. 8,367,004 B2.

High pressure homogenization apparatus using necks of dynamic type are marketed, among other things, by GEA NIRO-Soavi (Parma, Italy). The structure and the operation of these apparatus are also described, among other things, in the U.S. Pat. No. 4,773,833.

According to the amount of size reduction required, it is possible to treat the aqueous dispersion of expanded graphite several times in the homogenizer. This can be carried out in a continuous way, with various cycles through the homogenizer.

It is possible to associate the high pressure homogenization treatment defined above, also known as HPH, with other exfoliation and size reduction treatments, such as a treatment with ultrasounds. As a rule, this is performed at an energy level of from 10 to 200 Wh per gram of expanded graphite, and it is preferably performed before HPH treatment.

Preferably, the treatment of the dispersion of expanded graphite with ultrasounds is performed at an energy level of from 10 to 100 Wh per gram. The treatment with ultrasounds is performed using apparatus such as commercial ultrasonicators for treating liquids, where the acoustic energy is transmitted to the system by cavitation (formation and explosion of bubbles) using a sonotrode immersed in the liquid, with wave frequency of around 24 kHz, and with power as defined above.

The combination of the expansion treatment of the intercalated graphite at high temperature, of the ultrasonication treatment and of the subsequent HPH treatment enables extremely effective exfoliation of the graphite and reduction in the size thereof to be performed, obtaining graphene nanoplatelets directly dispersed in water, in relatively rapid times.

As mentioned previously, the final dispersion of the graphene nanoplatelets obtained after the exfoliation and size reduction treatment carried out with the methods defined above can be concentrated or dried, depending on the final form required for the graphene.

Concentration of the dispersion can be carried out with techniques known to those skilled in the art, such as removal of the dispersion medium by evaporation or filtration.

The object of drying the dispersion is to obtain a dry powder that is easily redispersible in various matrices, both solvents and polymers, where liquid is not desirable or manageable at process level.

The dispersion can be evaporated to dryness using prior art techniques, such as lyophilization, evaporation in a rotating evaporator or spray drying. In any case, the graphene nanoplatelets produced exhibit a high degree of dispersibility. Moreover, on the one hand the low oxygen content and the absence of reticular defects ensure high physical and chemical properties and on the other hand guarantee the permanent absence of stable re-agglomeration of the nanoplatelets, due to a chemical interaction of covalent type. The high aspect ratio (high lateral size and low thickness) ensures optimal performances in terms of electrical and thermal conductivity and barrier property.

A very important advantage of the process according to the invention consists in the possibility of operating without surfactant. In fact, in this case the graphene nanoplatelets obtained with the process of the invention are highly pure, both due to the high C/0 ratio and to the absence of extraneous substances, such as surfactants. In fact, it has been found that in the absence of surfactants it is possible to obtain graphene having substantially higher electrical conductivity than that of graphene obtained with prior art processes, i.e. in the presence of a surfactant. This improves the performance of the graphene in a plurality of applications.

More in particular, it has been found that pristine graphene nanoplatelets, at least 90% of which have a lateral size (x, y) from 50 to less than 10,000 nm, preferably from 500 to 8,000 nm and a thickness (z) from 0.34 to 50 nm, the lateral size being greater than the thickness (x, y>z), having a C:O ratio ≥100:1, have a high electrical conductivity. The electrical conductivity is determined on a film obtained by depositing an aqueous dispersion of said nanoplatelets on a glass substrate forming a film of 1 cm×1 cm and dried using a heating plate at 100° C. for 15 minutes, and is measured in a Van der Pauw configuration. This film has an electrical conductivity ≥1500 S/m, preferably ≥2000 S/m.

The availability of highly pure concentrated dispersions of graphene nanoplatelets of very small size represents a substantial improvement compared to the prior art, both from the point of view of performance of the dispersion and of its processability.

From the point of view of performance, it was found that the fine particles of graphene of very small size interact optimally with the host matrix to which the dispersion is applied, whatever it be.

More in general, the process according to the invention allows suspensions of graphene nanoplatelets to be obtained up to high concentrations, without the need for costly pre-treatments and without the nanoplatelets obtained being subject to phenomena of re-agglomeration.

The invention will now be described by means of some embodiments provided purely by way of example.

Method of Measuring of the Electrical Conductivity

The electrical conductivity was determined on a film obtained by depositing an aqueous dispersion of graphene nanoplatelets on a glass substrate provided with a square cavity having a size of 1 cm×1 cm, so as to form a film of 1 cm×1 cm. The dispersion was then dried using a heating plate at 100° C. for 15 minutes. The thickness of the film so formed was measured via Scanning Electron Microscope (SEM). The electrical conductivity was then measured in a Van der Pauw configuration. The general method is described in the following paper: "A method of measuring specific resistivity and Hall effect of discs of arbitrary shape" van der Pauw, L. J. (1958). *Philips Research Reports* 13: 1-9, February 1958. The specific method is described below, with reference to FIG. 1.

After the deposition of a square film of aqueous dispersion on a glass substrate, it was measured its sheet resistance, at the probe station, using the Van der Pauw Method. For this kind of measurements it was used a particular probe with four tips, in a square configuration, where is possible to have access (to give and to detect signal) at each tip (FIG. 1).

Van der Pauw has shown in the paper cited above that is possible to calculate the sheet resistance of an arbitrary shape samples determining the resistances along the vertical and horizontal edge ($R_{12,43}$ and $R_{23,14}$).

Therefore the probe was pressed on the film obtained from the dispersion, a current was applied along one edge ($I_{12}$) and the voltage across the other edge was measured ($V_{43}$) in order to find out the resistance of the edge ($R_{12,43}$), using the Ohm Law. To further improve the accuracy of the measurements it also determined the reciprocal resistances ($R_{43,12}$ and $R_{14,23}$) of $R_{12,43}$ and $R_{23,14}$. From the average of these two resistances it was possible to define $R_{vertical}$ and $R_{horizontal}$. On the same film at least 3 measurements were performed in different points. After the electrical characterization, the film thickness was measured at the SEM. In this way, knowing $R_{vertical}$, $R_{horizontal}$ and the thickness of the film it was possible to derive the sheet resistance using the Van der Pauw formula.

EXAMPLE 1

20 g of grade ES 250 F5 commercially available intercalated graphite (hereinafter IG), marketed by Graphit Kropfmühl AG, having a lateral size of around 300 μm, were expanded by insertion into an induction plasma with the following characteristics:

Type of gas for Plasma/Auxiliary/Carrier feed: Argon
Feed speed (IG): 5 g/min
Plasma gas flow rate: 15 l/min
Auxiliary gas flow rate: 1.5 l/min
Carrier gas flow rate: 1 l/min
RF: 40 MHz
Power: ~1400 W The expansion temperature was 1300° C. and the transit time was around 0.2 seconds. The resulting expanded graphite (EG) had an apparent density of ~2.5 g/l and a C/O ratio of around 150:1.

The expanded graphite, after being withdrawn from the plasma, was collected directly in 1000 mL of deionized water in the absence of a surfactant. The dispersion of EG thus obtained was subjected to an exfoliation and crushing treatment using a high pressure homogenizer (model M110P, Microfluidics Corp.), also called microfluidizer, in order to exfoliate the expanded graphite and to reduce its lateral sizes, obtaining graphene nanoplatelets characterized by a lateral size of less than 30 μm and a thickness of less than 10 nm. The dispersion was fed through the homogenizer for a total of 7 cycles operating at a pressure of 200 MPa and receiving an energy input of 47 Wh/g.

The effects of the exfoliation treatment and size reduction of the graphene nanoplatelets were analyzed using laser diffractometry (Mastersizer 3000, Malvern Instruments). This type of analysis provides an indication of the population distribution referred to the lateral size of the graphene nanoplatelets.

Table 1 compares the particle size values of a dispersion 20 g/L of EG collected in water in the absence of a surfactant, the same dispersion subjected to 1 and 7 homogenization cycles operating at a pressure of 200 MPa receiving an energy input of 7 Wh/g and 47 Wh/g respectively, in order to evaluate the effects of the two energy treatments being compared.

TABLE 1

| Sample | D10 (μm) | D50 (μm) | D90 (μm) |
|---|---|---|---|
| 20 g/L collected in water | 12.86 | 43.57 | 130.91 |
| 1 homogenizer cycle 7 Wh/g | 3.35 | 8.39 | 24.25 |
| 7 homogenizer cycles 47 Wh/g | 1.57 | 3.32 | 6.48 |

The data show the effective action of exfoliation and size reduction of the expanded graphite, which produced graphene nanoplatelets of very small size.

The 20 g/L water dispersion of graphene nanoplatelets subjected to 7 homogenization cycles, and having a lateral dimension D90 of 6.48 μm (6,480 nm), were tested to measure the electrical conductivity. The test method was that described above. A film having a thickness of 20 μm was formed on a glass substrate, having an electrical conductivity of 2460 S/m.

EXAMPLE 2

40 g of grade ES 250 F5 commercially available intercalated graphite (hereinafter IG), marketed by Graphit Kropfmühl AG, having a lateral size of around 300 μm, were expanded by insertion into an induction plasma having the characteristics of Example 1.

The expansion temperature was 1300° C. and the transit time was around 0.2 seconds. The resulting expanded graphite (EG) had an apparent density of ~2.5 g/l and a C/O ratio of around 150:1.

The expanded graphite, after being withdrawn from the plasma, was collected directly in 1000 mL of deionized water in the absence of a surfactant. The dispersion of EG thus obtained was subjected to exfoliation and crushing treatment using a homogenizer (PandaPLUS 2000, GEA Niro Soavi) in order to exfoliate the expanded graphite and to reduce its lateral size, obtaining graphene nanoplatelets characterized by a lateral size of less than 30 μm and a thickness of less than 10 nm. The dispersion was fed through the homogenizer for a total of 6 cycles, operating at a pressure of 150 MPa.

The effects of the energy treatment on the particle size of the graphene nanoplatelets were analyzed using laser diffractometry (Mastersizer 3000, Malvern Instruments). This type of analysis provides an indication of the population distribution referred to the lateral size of the graphene nanoplatelets, and is relative to a given energy treatment. Table 2 indicates the particle size values of a dispersion 40 g/L of EG collected in water in the absence of a surfactant after the homogenization treatment.

TABLE 2

| Sample | D10 (μm) | D50 (μm) | D90 (μm) |
|---|---|---|---|
| 40 g/L_6 cycles | 2.14 | 5.74 | 10.33 |

EXAMPLE 3

20 g of grade ES 250 F5 commercially available intercalated graphite (hereinafter IG), marketed by Graphit Kropfmühl AG, having a lateral size of around 300 μm, were expanded by insertion into an induction plasma with the following characteristics of Example 1.

The expansion temperature was 1300° C. and the transit time was around 0.2 seconds. The resulting expanded graphite (EG) had an apparent density of ~2.5 g/l and a C/O ratio of around 150:1.

The expanded graphite, after being withdrawn from the plasma, was collected directly in 1000 mL of deionized water in the absence of a surfactant. The dispersion of EG thus obtained was subjected to exfoliation and crushing treatment using a homogenizer (M110P, Microfluidics) in order to exfoliate the expanded graphite and to reduce its lateral sizes, obtaining graphene nanoplatelets characterized by a lateral size of less than 30 μm and a thickness of less than 10 nm.

The dispersion was fed through the homogenizer for a total of 7 cycles, with an energy input of 47 Wh/g. The effects of the energy treatment on the particle size of the graphene nanoplatelets were analyzed using laser diffractometry (Mastersizer 3000, Malvern Instruments). This type of analysis provides an indication of the population distribution referred to the lateral size of the graphene nanoplatelets, and is relative to a given energy treatment. Table 3 compares the particle size values of a dispersion 20 g/L of EG collected in water in the absence of a surfactant, the same dispersion subjected to 1 and 7 homogenization cycles with an energy input of 7 Wh/g and 47 Wh/g respectively and the same dispersion subjected to ultrasonication (UIP400S, Hielscher) with energy input of 10 WH/g and 50 Wh/g, in order to evaluate the effects of the two different energy treatments being compared.

TABLE 3

| Sample | D10 (μm) | D50 (μm) | D90 (μm) |
|---|---|---|---|
| 20 g/L collected in water | 12.86 | 43.57 | 130.91 |
| 20 g/L 1 HPH[1] cycle 7 Wh/g | 3.35 | 8.39 | 24.25 |
| 20 g/L US[2] 10 Wh/g | 6.01 | 17.90 | 36.46 |
| 20 g/L 7 HPH[1] cycles 47 Wh/g | 1.57 | 3.32 | 6.48 |
| 20 g/L US[2] 50 Wh/g | 2.27 | 6.73 | 17.18 |

[1]HPH = High Pressure Homogenization
[2]US = Ultrasonication

It is evident from Table 3 that high pressure homogenization treatment is more efficient than ultrasonication treatment.

EXAMPLE 4

20 g of grade ES 250 F5 commercially available intercalated graphite (hereinafter IG), marketed by Graphit Kropfmühl AG, having a lateral size of around 300 μm, were expanded by insertion into an induction plasma with the characteristics described in Example 1.

The expansion temperature was 1300° C. and the transit time was around 0.2 seconds. The resulting expanded graphite (EG) had an apparent density of ~2.5 g/l and a C/O ratio of around 150:1.

The expanded graphite, after being withdrawn from the plasma, was collected directly in 1000 mL of deionized water in the absence of a surfactant. In order to increase the concentration of the dispersion of EG, 4 liters of dispersion 20 g/L of EG obtained as described above were subjected to filtration and then evaporated to dryness, obtaining 80 g of EG powder.

Subsequently, 80 g of EG powder in the presence of the surfactant sodium naphthalene sulfonate (DNMS) at the concentration of 10 g/L were added to 1000 mL of dispersion having a concentration of 20 g/L of EG, maintained under mechanical stirring.

The enriched dispersion of EG was subjected to exfoliation and crushing treatment using a homogenizer (M110P, Microfluidics) in order to exfoliate the expanded graphite and to reduce its lateral sizes, obtaining graphene nanoplatelets characterized by a lateral size of less than 30 μm and a thickness of less than 50 nm.

The dispersion was fed through the homogenizer for 6 cycles, with an energy input of 40 Wh/g.

The same procedure was repeated replacing the naphthalene sulfonate with other surfactants, in particular sodium cholate (SC, Sigma Aldrich) and polyvinylpyrrolidone (PVP, Sigma Aldrich). The effects of the energy treatment on the particle size of the graphene nanoplatelets were analyzed using laser diffractometry (Mastersizer 3000, Malvern Instruments). This type of analysis provides an indication of the population distribution referred to the lateral size of the graphene nanoplatelets, and is relative to a given energy treatment.

Table 4 indicates the particle size values of the three 100 g/L dispersions thus obtained.

TABLE 4

| Sample | D10 (μm) | D50 (μm) | D90 (μm) |
|---|---|---|---|
| 100 g/L 6 HPH[1] cycles DNMS[2] | 2.22 | 6.35 | 20.93 |
| 100 g/L 6 HPH[1] cycles SC[3] | 1.76 | 5.37 | 20.62 |
| 100 g/L_6 HPH[1] cycles PVP[4] | 1.84 | 5.09 | 17.34 |

[1]HPH = (High Pressure Homogenization)
[2]DNMS = sodium naphthalene sulfonate
[3]SC = Sodium cholate
[4]PVP = polyvinylpyrrolidone

EXAMPLE 5

50 g of grade ES 250 F5 commercially available intercalated graphite (hereinafter IG), marketed by Graphit Kropfmühl AG, having a lateral size of around 300 μm, were expanded by insertion into an induction plasma with the characteristics described in Example 1.

The expansion temperature was 1300° C. and the transit time was around 0.2 seconds. The resulting expanded graphite (EG) had an apparent density of ~2.5 g/l and a C/O ratio of around 150:1.

The expanded graphite, after being withdrawn from the plasma, was collected in 1000 mL of acetone (Acetone >99.5%, Sigma Aldrich) maintained under mechanical stirring.

The dispersion thus obtained (50 g/L) was subjected to exfoliation and crushing treatment using a homogenizer (M110P, Microfluidics) in order to exfoliate the expanded graphite and to reduce its lateral sizes, obtaining graphene nanoplatelets characterized by a lateral size of less than 30 µm and a thickness of less than 10 nm.

The dispersion was fed through the homogenizer for 6 cycles, with an energy input of 40 Wh/g. The same procedure was repeated replacing the acetone with ethanol.

The effects of the energy treatment on the particle size of the graphene nanoplatelets were analyzed using laser diffractometry (Mastersizer 3000, Malvern Instruments). This type of analysis provides an indication of the population distribution referred to the lateral size of the graphene nanoplatelets, and is relative to a given energy treatment. Table 5 indicates the particle size values of the 50 g/L dispersions obtained in acetone and ethanol following the homogenization treatment.

| Sample | D10 (µm) | D50 (µm) | D90 (µm) |
|---|---|---|---|
| 50 g/L 6 HPH[1] cycles Acetone | 2.21 | 5.16 | 12.25 |
| 50 g/L 6 HPH[1] cycles Ethanol | 2.25 | 5.19 | 11.98 |

[1]HPH = High Pressure Homogenization

EXAMPLE 6

100 g of grade ES 250 F5 commercially available intercalated graphite (hereinafter IG), marketed by Graphit Kropfmühl AG, having a lateral size of around 300 µm, were expanded by insertion into an induction plasma with the characteristics described in Example 1.

The expansion temperature was 1300° C. and the transit time was around 0.2 seconds. The resulting expanded graphite (EG) had an apparent density of ~2.5 g/l and a C/O ratio of around 150:1.

The expanded graphite, after being withdrawn from the plasma, was collected in 1000 mL of epoxy resin (Epikote 215, Momentive) maintained under mechanical stirring. The viscosity of the resin was 1100 mPas at 25° C., measured with the method ASTM D445.

The dispersion thus obtained (100 g/L) was subjected to exfoliation and crushing treatment using a homogenizer (M110P, Microfluidics) in order to exfoliate the expanded graphite and to reduce its lateral sizes, obtaining graphene nanoplatelets characterized by a lateral size of less than 30 µm and a thickness of less than 50 nm. The dispersion was fed through the homogenizer for 6 cycles, with an energy input of 40 Wh/g.

In order to evaluate the lateral size and average thickness of the nanoplatelets, the resin was hardened by adding modified cycloaliphatic amine marketed with the name Epikure 541 (Momentive) in a ratio of 1:1. In this way, samples were prepared, which were fractured, obtaining sections that were coated with a 5 nm layer of gold and observed under the electron microscope. The lateral sizes of the nanoplatelets were generally less than 20 µm and the thickness less than 10 nm.

EXAMPLE 7

90 g of grade ES 250 F5 commercially available intercalated graphite (hereinafter IG), marketed by Graphit Kropfmühl AG, having a lateral size of around 300 µm, were expanded by insertion into an induction plasma with the characteristics described in Example 1.

The expansion temperature was 1300° C. and the transit time was around 0.2 seconds. The resulting expanded graphite (EG) had an apparent density of ~2.5 g/l and a C/O ratio of around 150:1.

The expanded graphite, after being withdrawn from the plasma, was collected in 1000 mL of naphthenic oil (Nytex 810, Nynas), and maintained under mechanical stirring.

The dispersion thus obtained (90 g/L) was subjected to exfoliation and crushing treatment using a homogenizer (M110P, Microfluidics) in order to exfoliate the expanded graphite and to reduce its lateral sizes, obtaining graphene nanoplatelets characterized by a lateral size of less than 50 µm and a thickness of less than 50 nm. The dispersion was fed through the homogenizer for 6 cycles, with an energy input of 40 Wh/g.

In order to evaluate the lateral size and average thickness of the nanoplatelets, the oil was diluted in acetone in a ratio of 1:100 and deposited dropwise on a silicon dioxide substrate, which was then analyzed under the electron microscope. The lateral sizes of the nanoplatelets were generally less than 50 µm and the thickness less than 15 nm.

The invention claimed is:

1. A process for producing graphene nanoplatelets having a C/O ratio ≥100:1, comprising the steps of:
    a) expanding flakes of intercalated graphite having a lateral size of ≤500 µm by exposing said flakes to a temperature from 1300 to 12000° C. for a time of less than 2 seconds and obtaining an expanded graphite,
    b) dispersing said expanded graphite in a dispersing medium,
    wherein said dispersing medium is water and said dispersion of said expanded graphite is carried out in the absence of a surfactant or in the presence of a surfactant in an amount not higher than 1% by weight of the weight of said expanded graphite, and
    said dispersion of said expanded graphite in said dispersing medium is carried out directly after said step of expansion at high temperature by collecting said expanded graphite in said dispersing medium just after its formation;
    c) subjecting said expanded graphite obtained from step b) to exfoliation and size reduction treatment by high pressure homogenization in a homogenizer in which the dispersion of said expanded graphite is pumped at a pressure above 35 MPa through one or more microchannels or necks having a transverse section of 500 µm or less, whereby the particles of said expanded graphite are subjected to shear stresses and are caused to collide at an energy level from 10 to 200 Wh/g, and
    d) obtaining a dispersion of said graphene nanoplatelets in said dispersing medium, wherein at least 90% of said graphene nanoplatelets have a lateral size (x, y) from 50 to 50,000 nm and a thickness (z) from 0.34 to 50 nm, the lateral size being greater than the thickness (x,y>z).

2. The process of claim 1, wherein said size reduction treatment by high pressure homogenization of said step c) is carried out in a homogenizer in which the dispersion of expanded graphite is pumped at a pressure from 100 to 500 MPa.

3. The process of claim 1, wherein said size reduction treatment by high pressure homogenization of said step c) is carried out in a homogenizer in which the dispersion of expanded graphite is pumped at a pressure from 150 to 500 MPa.

4. The process of claim 1, wherein said high pressure homogenization treatment is carried out in a homogenizer in which the dispersion of said expanded graphite is pumped through one or more micro-channels or necks having a transverse section ≤250 μm.

5. The process of claim 1, wherein said high pressure homogenization pumped through one or more micro-channels or necks having a transverse section ≤100 μm.

6. The process of claim 1, wherein the process is carried out in a continuous manner by continuously feeding said graphite flakes to said high temperature expansion step, continuously discharging the so-obtained expanded graphite in said dispersing medium and continuously subjecting said expanded graphite dispersed in said dispersing medium to said exfoliation and size reduction treatment carried out by high pressure homogenization.

7. The process of claim 1, further comprising:
   e) concentrating or drying said dispersion obtained after said exfoliation and size reduction treatment.

8. The process of claim 1, wherein said step a) of expanding said intercalated graphite flakes at a temperature from 1300 to 12000° C. for a time of less than 2 seconds is carried out by means of an electric arc, a microwave oven, a high frequency induction oven, or by forming plasma.

* * * * *